(12) United States Patent
Sawal et al.

(10) Patent No.: US 12,407,667 B2
(45) Date of Patent: Sep. 2, 2025

(54) LOCATION AWARE TRUSTED CLOUD RESOURCE PROVISIONING

(71) Applicant: Dell Products L.P., Round Rock, TX (US)

(72) Inventors: Vinay Sawal, Fremont, CA (US); Viswanath Ponnuru, Bangalore (IN); Jason Matthew Young, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 18/343,640

(22) Filed: Jun. 28, 2023

(65) Prior Publication Data

US 2025/0007898 A1    Jan. 2, 2025

(51) Int. Cl.
  *H04L 9/40* (2022.01)
(52) U.S. Cl.
  CPC ...... *H04L 63/0807* (2013.01); *H04L 63/0823* (2013.01)
(58) Field of Classification Search
  CPC .......... H04L 63/0807; H04L 63/0823
  USPC .............................................................. 726/9
  See application file for complete search history.

(56) References Cited

U.S. PATENT DOCUMENTS

| 8,239,549 | B2 * | 8/2012 | Aura | H04L 61/5014 |
| | | | | 709/228 |
| 2014/0230040 | A1 * | 8/2014 | Crowther | H04W 12/069 |
| | | | | 726/10 |
| 2014/0280846 | A1 * | 9/2014 | Gourlay | H04L 41/0893 |
| | | | | 709/223 |
| 2015/0172054 | A1 * | 6/2015 | Prakash | H04L 9/3263 |
| | | | | 713/189 |
| 2017/0353435 | A1 * | 12/2017 | Pritikin | H04W 4/02 |
| 2019/0260762 | A1 * | 8/2019 | Fynaardt | H04W 12/06 |
| 2020/0374700 | A1 * | 11/2020 | Smith | H04L 9/3268 |
| 2023/0125588 | A1 * | 4/2023 | Savage | H04L 9/3226 |
| | | | | 713/175 |

(Continued)

OTHER PUBLICATIONS

Lundblade, et al. "The Entity Attestation Token (EAT)" RFC 9711, [https://datatracker.ietf.org/doc/rfc9711/] retrieved May 7, 2025, 85 pages.

*Primary Examiner* — Thanh T Le
(74) *Attorney, Agent, or Firm* — Amin, Turocy & Watson, LLP

(57) ABSTRACT

A system can receive an untrusted onboard announcement message from a remote computer. The system can, based on the untrusted onboard announcement message, initiate an onboarding service policy to verify a device location claims policy associated with the remote computer. The system can receive an indication of a remote access controller hardware component of the remote computer, wherein the indication is of verifying a network port authentication policy applicable to determine whether a port-based network access control protocol certificate hostname that is associated with the remote computer matches an entity attestation token attribute extensible authentication protocol-transport layer platform certificate hostname of the remote access controller hardware component to determine a network authentication status. The system can determine whether device onboard location is successful based on a device location verification policy status and the indication.

20 Claims, 10 Drawing Sheets

(56) References Cited

U.S. PATENT DOCUMENTS

| | | |
|---|---|---|
| 2025/0004639 A1 | 1/2025 | Sawal et al. |
| 2025/0005128 A1 | 1/2025 | Sawal et al. |
| 2025/0005614 A1 | 1/2025 | Sawal et al. |
| 2025/0007954 A1 | 1/2025 | Sawal et al. |

* cited by examiner

600

602

STORING THE SIGNED PLATFORM CERTIFICATE IN THE STORAGE ASSOCIATED WITH THE REMOTE ACCESS CONTROLLER HARDWARE COMPONENT OF THE REMOTE COMPUTER WHILE THE REMOTE COMPUTER IS PHYSICALLY LOCATED IN A FIRST PHYSICAL LOCATION THAT IS ASSOCIATED WITH AN ENTITY THAT CONTROLS THE SYSTEM 604

TRANSFERRING THE REMOTE COMPUTER FROM THE FIRST LOCATION TO A SECOND PHYSICAL LOCATION 606

RECEIVING THE UNTRUSTED ONBOARD ANNOUNCEMENT FROM THE REMOTE COMPUTER WHEN THE REMOTE COMPUTER IS LOCATED AT THE SECOND PHYSICAL LOCATION 608

RECEIVING AN UNTRUSTED ONBOARD ANNOUNCEMENT MESSAGE FROM A REMOTE ACCESS CONTROLLER HARDWARE 804

↓

BASED ON THE UNTRUSTED ONBOARD ANNOUNCEMENT MESSAGE, INITIATING AN ONBOARDING SERVICE POLICY TO VERIFY A DEVICE LOCATION CLAIMS POLICY ASSOCIATED WITH THE REMOTE COMPUTER 806

↓

RECEIVING, FROM THE REMOTE COMPUTER, AN INDICATION OF WHETHER A FIRST PHYSICAL LOCATION OF THE REMOTE COMPUTER MATCHES A SECOND PHYSICAL LOCATION OF THE REMOTE COMPUTER THAT IS STORED IN A CERTIFICATE ON THE REMOTE COMPUTER, ACCORDING TO A PORT-BASED NETWORK ACCESS CONTROL PROTOCOL 808

↓

DETERMINING WHETHER DEVICE ONBOARD LOCATION IS SUCCESSFUL BASED ON A LOCATION VERIFICATION POLICY STATUS AND THE INDICATION 810

RECEIVING AN UNTRUSTED ONBOARD ANNOUNCEMENT MESSAGE FROM A REMOTE COMPUTER 904

↓

BASED ON THE UNTRUSTED ONBOARD ANNOUNCEMENT MESSAGE, INITIATING AN ONBOARDING SERVICE POLICY TO VERIFY A DEVICE LOCATION CLAIMS POLICY ASSOCIATED WITH THE REMOTE COMPUTER 906

↓

RECEIVING, FROM THE REMOTE COMPUTER, AN INDICATION OF WHETHER A FIRST PHYSICAL LOCATION OF THE REMOTE COMPUTER MATCHES A SECOND PHYSICAL LOCATION OF THE REMOTE COMPUTER THAT IS STORED IN A CERTIFICATE ON THE REMOTE COMPUTER 908

↓

DETERMINING WHETHER DEVICE ONBOARD LOCATION IS SUCCESSFUL BASED ON A LOCATION VERIFICATION POLICY STATUS AND THE INDICATION 910

LOCATION AWARE TRUSTED CLOUD RESOURCE PROVISIONING

BACKGROUND

Computer systems can be managed remotely.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive an untrusted onboard announcement message from a remote computer. The system can, based on the untrusted onboard announcement message, initiate an onboarding service policy to verify a device location claims policy associated with the remote computer. The system can receive an indication of a remote access controller hardware component of the remote computer, wherein the indication is of verifying a network port authentication policy applicable to determine whether a port-based network access control protocol certificate hostname that is associated with the remote computer matches an entity attestation token attribute extensible authentication protocol-transport layer platform certificate hostname of the remote access controller hardware component to determine a network authentication status. The system can determine whether device onboard location is successful based on a device location verification policy status and the indication.

An example method can comprise receiving, by a system comprising a processor, an untrusted onboard announcement message from a remote access controller hardware. The method can further comprise, based on the untrusted onboard announcement message, initiating, by the system, an onboarding service policy to verify a device location claims policy associated with the remote computer. The method can further comprise receiving, by the system and from the remote computer, an indication of whether a first physical location of the remote computer matches a second physical location of the remote computer that is stored in a certificate on the remote computer, according to a port-based network access control protocol. The method can further comprise determining, by the system, whether device onboard location is successful based on a location verification policy status and the indication.

An example non-transitory computer-readable medium can comprise instructions that, in response to execution, cause a system comprising a processor to perform operations. These operations can comprise receiving an untrusted onboard announcement message from a remote computer. These operations can further comprise, based on the untrusted onboard announcement message, initiating an onboarding service policy to verify a device location claims policy associated with the remote computer. These operations can further comprise receiving, from the remote computer, an indication of whether a first physical location of the remote computer matches a second physical location of the remote computer that is stored in a certificate on the remote computer. These operations can further comprise determining whether device onboard location is successful based on a location verification policy status and the indication.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example process flow that can facilitate location aware trusted cloud resource provisioning, in accordance with an embodiment of this disclosure;

FIG. 8 illustrates another example process flow that can facilitate location aware trusted cloud resource provisioning, in accordance with an embodiment of this disclosure;

FIG. 9 illustrates another example process flow that can facilitate location aware trusted cloud resource provisioning, in accordance with an embodiment of this disclosure;

DETAILED DESCRIPTION

Overview

A cloud computing platform can provide a common pool of configurable computing resources with easy, on-demand access. These resources can comprise servers, applications, storage, and various other services. A private cloud can comprise a cloud computing platform that is owned and operated as a resource, where access to that resource is restricted to authorized organization. The present techniques can be implemented to determine a physical location of computers for a cloud platform to meet compliance requirements for the cloud computing platform and/or the customer of the computers.

Bare metal provisioning of a computer can generally comprise deploying in-band (host) and out-of-band system configurations, and a host application stack. A problem with bare metal provisioning can be that a physical location of a customer order received in a cloud environment can matter for several reasons—e.g., it can ensure that a customer-ordered device is installed in a proper location; and compliance rules and/or privacy laws can require that computers are sold, installed, and/or operated in accordance with government rules and regulations. Another problem with bare metal provisioning can be that provable device location and possession can be difficult according to prior approaches.

The present techniques can be implemented to establish that a customer-ordered computer from a cloud computing platform entity is operating and running at a particular location, per security compliance in a bare metal provisioning system.

The present techniques can be implemented to facilitate secure device onboarding using a location-aware policy that is enforced in a remote computer's remote access controller hardware component platform certificate.

In contrast to the present techniques, some prior approaches use geo-location (longitude-latitude) based security enforcement. In contrast, the present techniques verify an actual location of the computer.

Example Architectures

Figure 1:
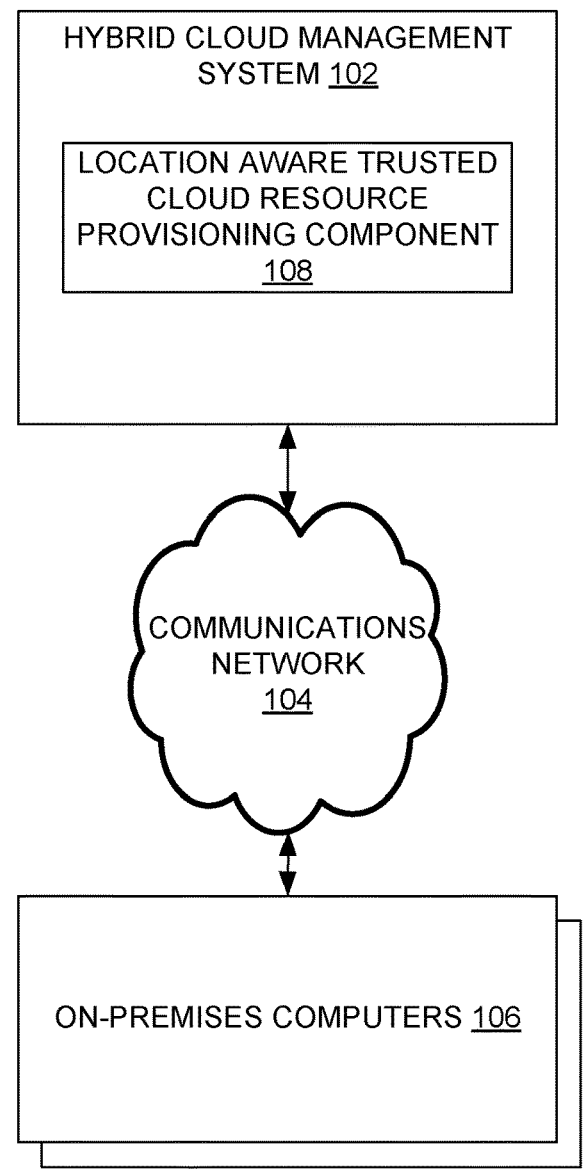
FIG. 1 illustrates an example system architecture that can facilitate location aware trusted cloud resource provisioning, in accordance with an embodiment of this disclosure.

FIG. 1 illustrates an example system architecture 100 that can facilitate location aware trusted cloud resource provisioning, in accordance with an embodiment of this disclosure.

System architecture 100 comprises hybrid cloud management system 102, communications network 104, and on-premises computers 106. In turn, hybrid cloud management system 102 comprises location aware trusted cloud resource provisioning component 108.

Figure 10:
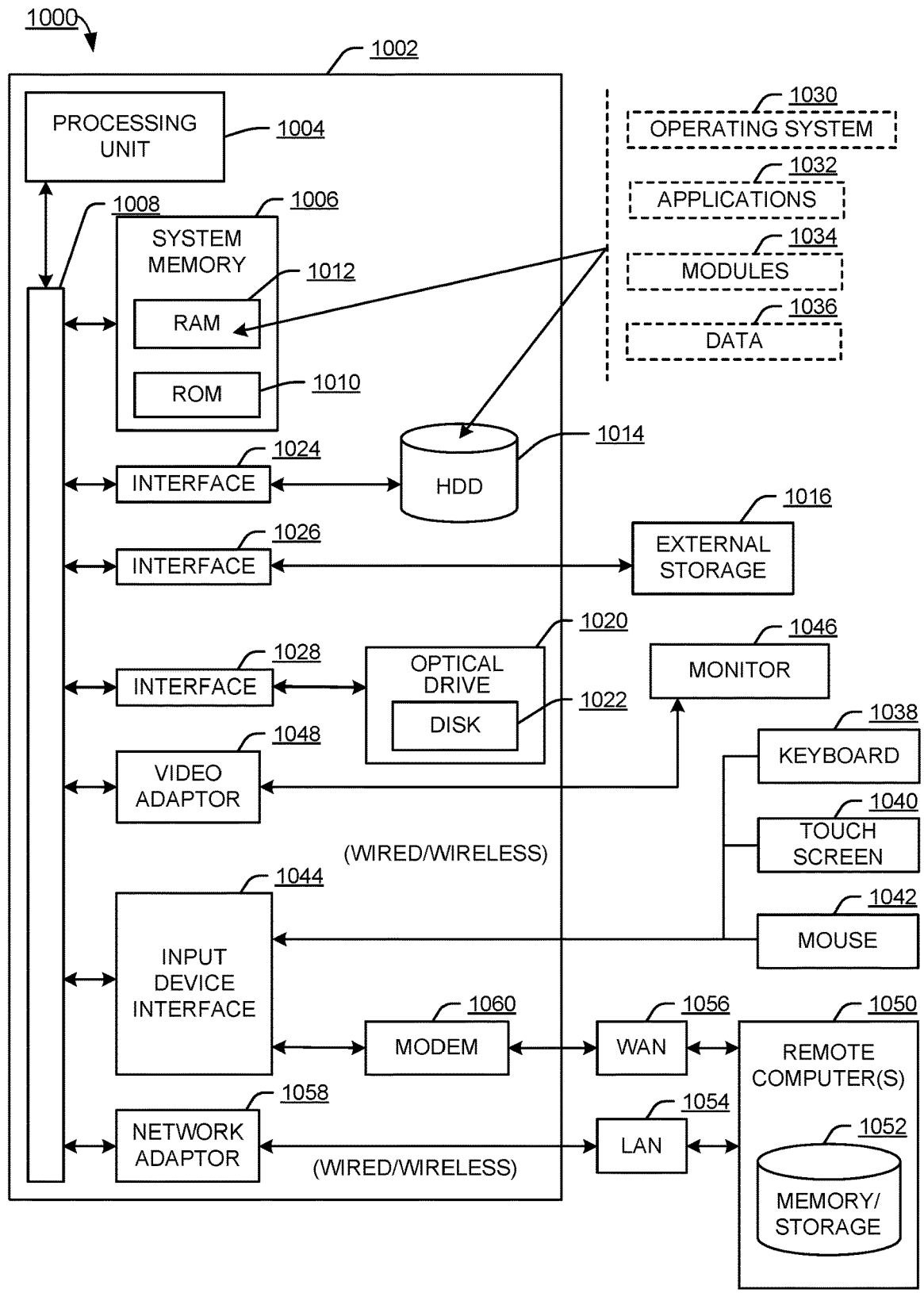
FIG. 10 illustrates an example block diagram of a computer operable to execute an embodiment of this disclosure.

Each of hybrid cloud management system 102 and/or on-premises computers 106 can be implemented with part(s) of computing environment 1000 of FIG. 10. Communications network 104 can comprise a computer communications network, such as the Internet.

On-premises computers 106 can comprise one or more computers that are installed on a customer's premises and are (or are to be) managed by hybrid cloud management system 102. As part of that, hybrid cloud management system 102 can securely onboard computers of on-premises computers 106, including re-validate those computers when they have parts replaced or modified (e.g., reset or firmware modifications).

In some examples, location aware trusted cloud resource provisioning component 108 can implement part(s) of the process flows of FIGS. 4-9 to implement location aware trusted cloud resource provisioning.

It can be appreciated that system architecture 100 is one example system architecture for location aware trusted cloud resource provisioning, and that there can be other system architectures that facilitate location aware trusted cloud resource provisioning.

Figure 2:
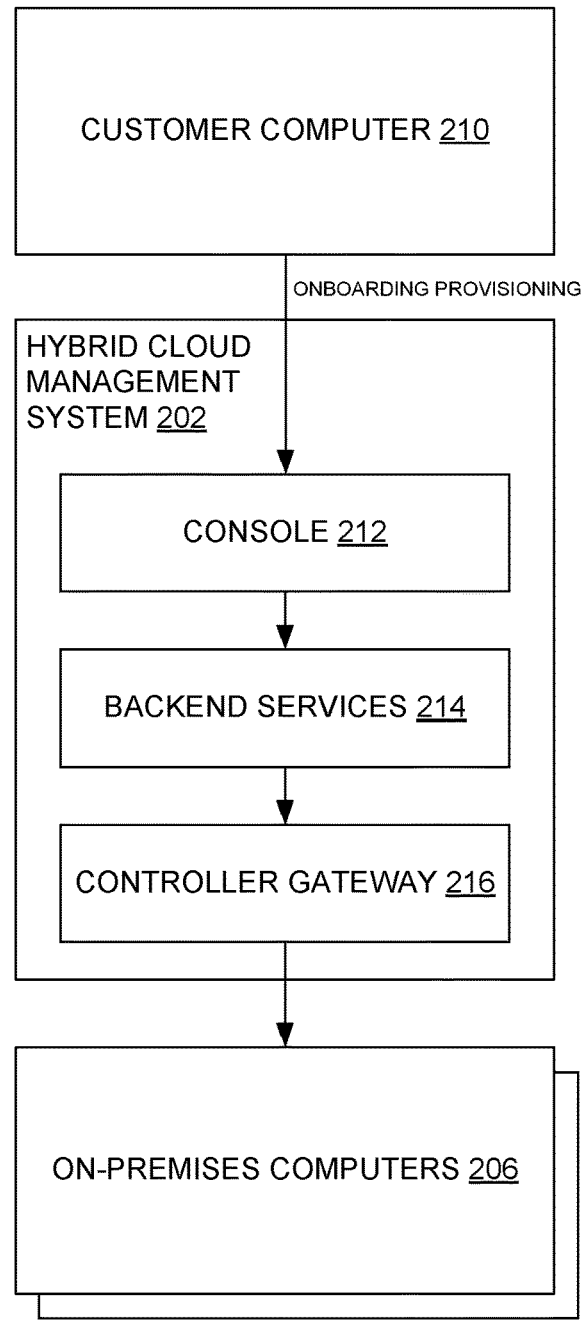
FIG. 2 illustrates another example system architecture that can facilitate location aware trusted cloud resource provisioning, in accordance with an embodiment of this disclosure.

FIG. 2 illustrates another example system architecture 200 that can facilitate location aware trusted cloud resource provisioning, in accordance with an embodiment of this disclosure. In some examples, part(s) of system architecture 200 can be used to implement part(s) of system architecture 100 of FIG. 1.

System architecture 200 comprises hybrid cloud management system 202 (which can be similar to hybrid cloud management system 102 of FIG. 1), on-premises computers 206 (which can be similar to on-premises computers 106), and customer computer 210. In turn, hybrid cloud management system 202 comprises console 212, backend services 214, and controller gateway.

Customer computer 210 can contact hybrid cloud management system 202 to initiate onboarding provisioning of one or more computers of on-premises computers 206. This message from customer computer 210 can be received at console 212 (which can generally comprise a front end of hybrid cloud management system 202 that is configured to interact with customer computer 210), and can be communicated through backend services 214 and controller gateway 216 to perform onboarding provisioning of one or more computers of on-premises computers 206.

Backend services 214 can comprise a collection of services running in the cloud that are configured to provide backend functions for running services for a customer subscribing to cloud resources. Controller gateway 216 can comprise communication infrastructure that is configured to connect cloud services to a remote endpoint that is physically located on-premises for a customer.

Figure 3:
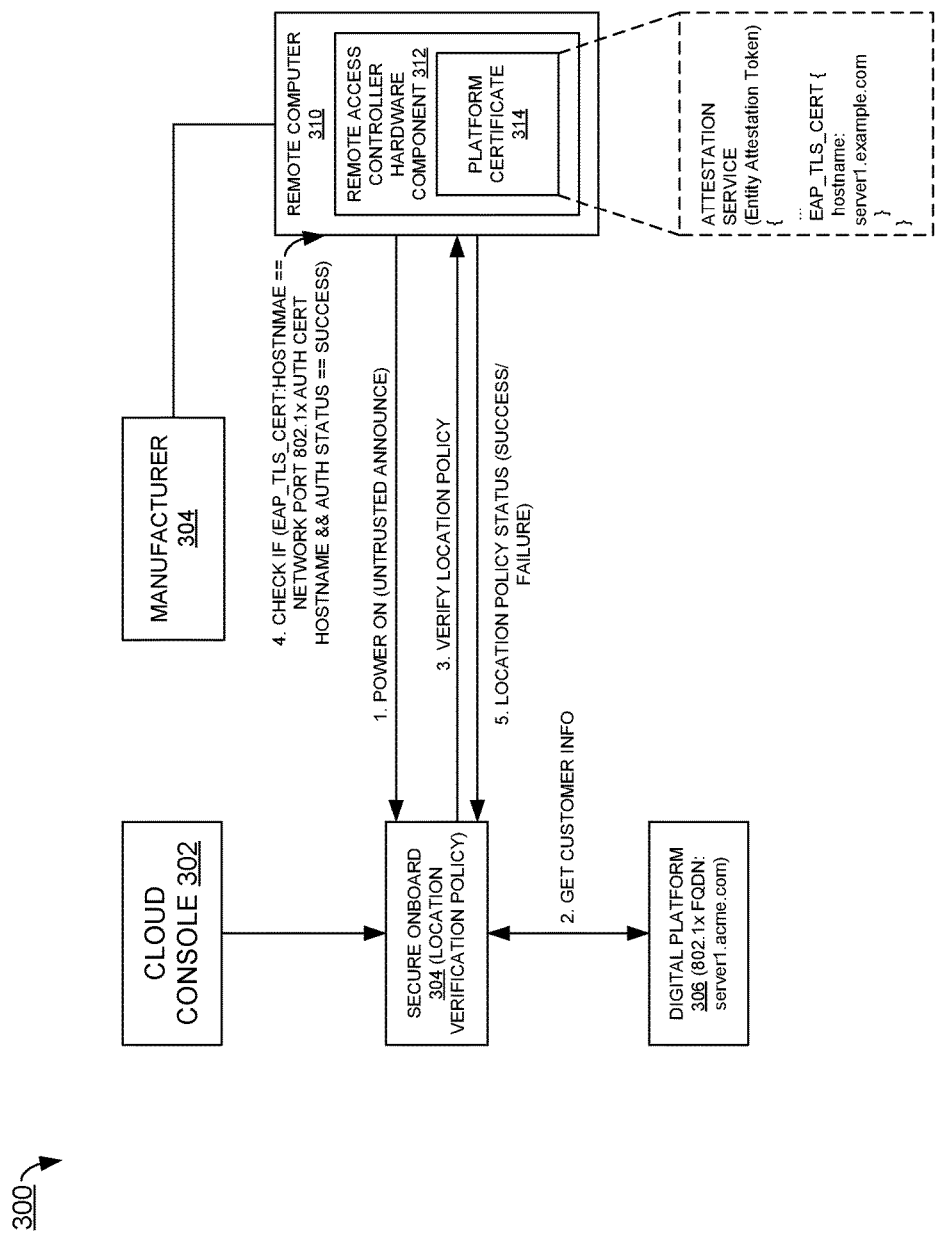
FIG. 3 illustrates another example system architecture that can facilitate location aware trusted cloud resource provisioning, in accordance with an embodiment of this disclosure.

FIG. 3 illustrates another example system architecture 300 that can facilitate location aware trusted cloud resource provisioning, in accordance with an embodiment of this disclosure. In some examples, part(s) of system architecture 300 can be used to implement part(s) of system architecture 100 of FIG. 1.

System architecture 300 comprises cloud console 302, secure onboard 304, digital platform 306 (which can comprise a computer system that handles customer order workflows, such as those customer orders for remote computer 310), manufacturer 308, remote computer 310 (which can be similar to a computer of on-premises computers 106 of FIG. 1), remote access controller hardware component 312, and platform certificate 314.

A certificate can generally comprise an artifact that cryptographically binds a subject's identity to its public key or attributes using a certificate structure. Generating a certificate can comprise assembling values for certificate fields and signing over the assembled fields. A platform certificate such as platform certificate 314 can attest that a specific platform contains a unique trusted platform module (which can comprise a hardware component that is configured to create and store cryptographic keys, and to confirm a state of a computer's operating system and firmware) and a unique trusted building block. A trusted building block can generally comprise parts of a root of trust that lack shielded locations or protected capabilities. Platform certificate 314 can comprise assertions about trust from a platform manufacturer. That is, a platform certificate can assert a platform's security properties and configuration as shipped from a manufacturer to a customer.

Location aware trusted cloud resource provisioning can be implemented as follows.

A customer or tenant of a cloud computing platform can subscribe to a cloud compute resource subscription model using an cloud console system. A bare metal provisioning component, such as provided by cloud console 302, can gather customer order information that includes customer-specific information (e.g., an email address, a target geo-location, and a 802.1x fully qualified domain name (FQDN)), and hardware details (e.g., device model, base firmware). After successful registration, customer information can be stored in digital platform 306 for further processing.

An example high-level workflow in system architecture 300 can describe onboarding in a cloud environment using an entity attestation protocol (EAP) service of a platform certificate 314 of remote access controller hardware component 312 of remote computer 310. In an example, the workflow can occur as:

Remote computer 310 is powered on in a customer location and a client application of remote computer 310 initiates an onboarding process by sending an untrusted onboard announce notification to cloud console 302.

Secure onboard 304 can initiate an onboarding service protocol to verify a device location claims policy.

Remote access controller hardware component 312 can verify a network port authentication policy to check if an 802.1x certificate hostname matches a remote access controller hardware component entity attestation token (EAT) attribute extensible authentication protocol (EAP) transport layer security (TLS) certificate (EAP_TLS_Cert) hostname and network authentication status to determine network authentication status.

A network authentication location status can be responded to by a cloud offer controller.

A secure onboard service of cloud console 302 can use the location verification policy status to determine whether the device onboard location is successful or unsuccessful to enforce a next set of security policies.

Example Process Flows

Figure 4:
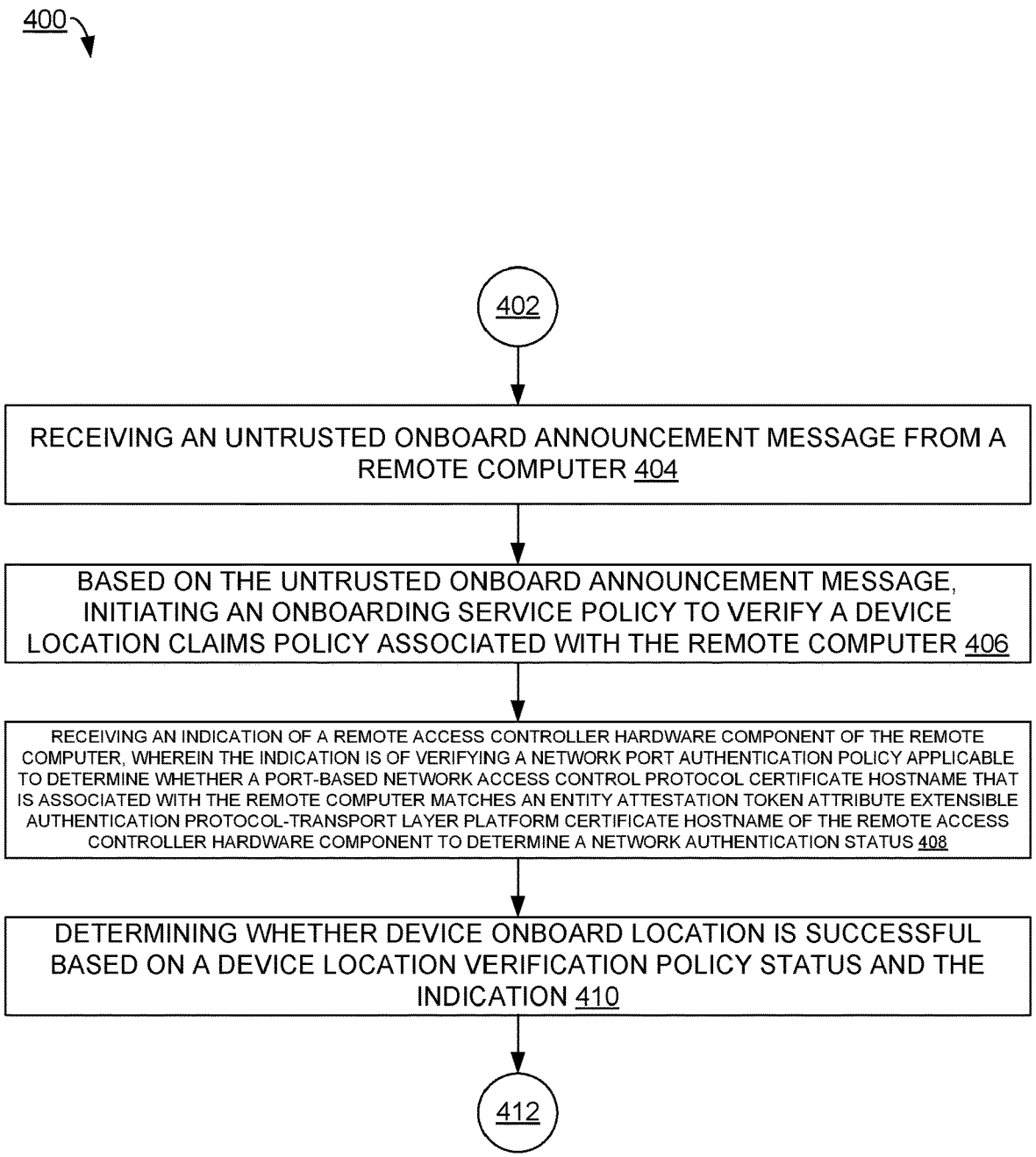
FIG. 4 illustrates an example process flow that can facilitate location aware trusted cloud resource provisioning, in accordance with an embodiment of this disclosure.

FIG. 4 illustrates an example process flow 400 for evaluating a computer with a part replacement and that can facilitate location aware trusted cloud resource provisioning, in accordance with an embodiment of this disclosure. In some examples, one or more embodiments of process flow 400 can be implemented by location aware trusted cloud resource provisioning component 108 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, and/or process flow 900 of FIG. 9.

Process flow 400 begins with 402, and moves to operation 404.

Operation 404 depicts receiving an untrusted onboard announcement message from a remote computer. Using the example of FIG. 3, this can comprise secure onboard 304 receiving an untrusted onboard announcement message from remote computer 310.

After operation 404, process flow 400 moves to operation 406.

Operation 406 depicts, based on the untrusted onboard announcement message, initiating an onboarding service policy to verify a device location claims policy associated with the remote computer. Continuing with the example of FIG. 3, this can comprise secure onboard 304 initiating an onboarding service protocol to verify a device location claims policy.

After operation 406, process flow 400 moves to operation 408.

Operation 408 depicts receiving an indication of a remote access controller hardware component of the remote computer, wherein the indication is of verifying a network port authentication policy applicable to determine whether a port-based network access control protocol certificate hostname that is associated with the remote computer matches an entity attestation token attribute extensible authentication protocol-transport layer platform certificate hostname of the remote access controller hardware component to determine a network authentication status.

In some examples, a port-based network access control protocol can comprise an 802.1x protocol. Continuing with the example of FIG. 3, this can comprise secure onboard 304 receiving a network authentication location status message from remote access controller hardware component 312 of remote computer 310.

In some examples, the entity attestation token attribute extensible authentication protocol-transport layer platform certificate hostname of the remote computer comprises a fully qualified domain name. That is, an EAP_TLS_Cert can contain a FQDN (e.g., server1.example.com).

After operation 408, process flow 400 moves to operation 410.

Operation 410 depicts determining whether device onboard location is successful based on a device location verification policy status and the indication. Continuing with the example of FIG. 3, this can comprise secure onboard 304 determining whether to allow or deny onboarding for remote computer 310.

After operation 410, process flow 400 moves to 412, where process flow 400 ends.

Figure 5:
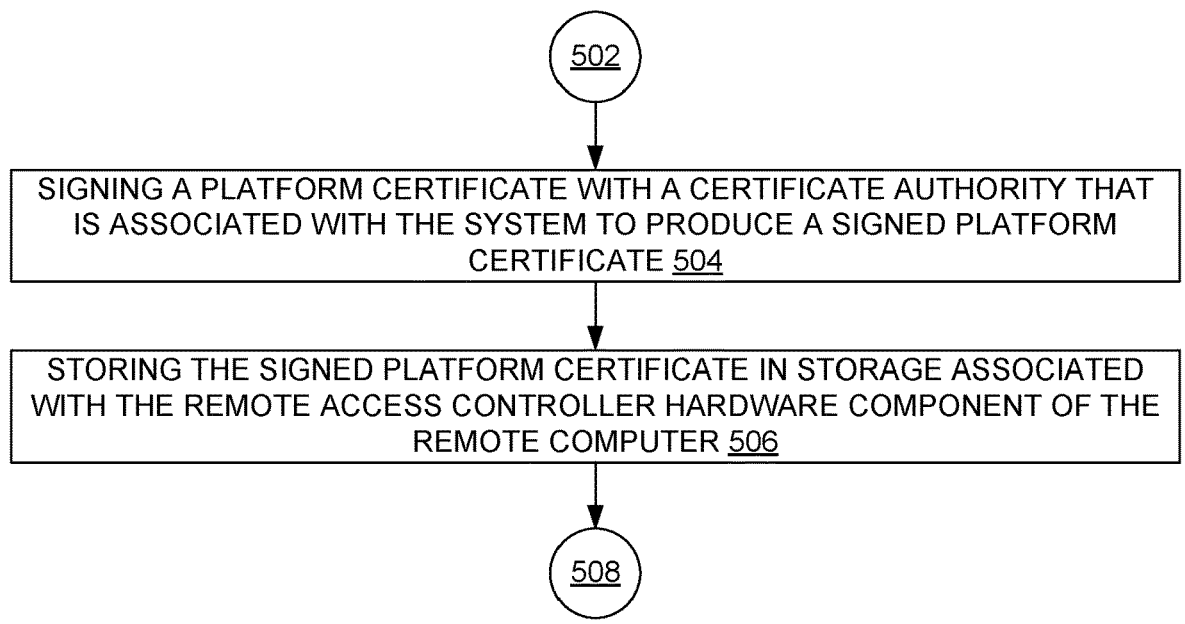
FIG. 5 illustrates an example process flow that can facilitate location aware trusted cloud resource provisioning, in accordance with an embodiment of this disclosure.

FIG. 5 illustrates an example process flow 500 for evaluating a computer with a part replacement and that can facilitate location aware trusted cloud resource provisioning, in accordance with an embodiment of this disclosure. In some examples, one or more embodiments of process flow 500 can be implemented by location aware trusted cloud resource provisioning component 108 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, and/or process flow 900 of FIG. 9.

Process flow 500 begins with 502, and moves to operation 504.

Operation 504 depicts signing a platform certificate with a certificate authority that is associated with the system to produce a signed platform certificate. That is, the manufacturer of a computer can sign the remote computer's platform certificate with the manufacturer's root certificate authority.

In some examples, storing the signed platform certificate in the storage associated with the remote access controller hardware component of the remote computer is performed while the remote computer is physically located in a first physical location that is associated with an entity that controls the system, and before the remote computer is transferred to a second physical location from which the untrusted onboard announcement message from the remote computer originated. That is, the certificate can be stored in the remote computer by a manufacturer of the remote computer, and before the computer is transported to a location from which it will be onboarded.

In some examples, the signed platform certificate comprises the entity attestation token attribute extensible authentication protocol-transport layer platform certificate hostname of the remote computer. That is, a signed platform certificate can include an EAP_TLS_Cert.

After operation 504, process flow 500 moves to operation 506.

Operation 506 depicts storing the signed platform certificate in storage associated with the remote access controller hardware component of the remote computer. Using the example of FIG. 3, the signed platform certificate can be stored as platform certificate 314.

After operation 506, process flow 500 moves to 508, where process flow 500 ends.

FIG. 6 illustrates an example process flow 600 for evaluating a computer with a part replacement and that can facilitate location aware trusted cloud resource provisioning, in accordance with an embodiment of this disclosure. In some examples, one or more embodiments of process flow 600 can be implemented by location aware trusted cloud resource provisioning component 108 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, and/or process flow 900 of FIG. 9.

Process flow 600 begins with 602, and moves to operation 604.

Operation 604 depicts storing the signed platform certificate in the storage associated with the remote access controller hardware component of the remote computer while the remote computer is physically located in a first physical location that is associated with an entity that controls the system. Using the example of FIG. 3, this can be performed at manufacturer 308.

In some examples where the entity is a first entity, operation 604 comprises receiving data indicative of the second physical location (of operation 606), the data originating via an account associated with a second entity that is associated with the second physical location. That is, customer order data used to manufacture the remote computer can indicate where the remote computer will be physically installed.

After operation 604, process flow 600 moves to operation 606.

Operation 606 depicts transferring the remote computer from the first location to a second physical location. Using the example of FIG. 3, the remote computer can be transferred from manufacturer 308 to remote computer 310, which can be a location from which the remote computer is onboarded.

After operation 606, process flow 600 moves to operation 608.

Operation 608 receiving the untrusted onboard announcement from the remote computer when the remote computer is located at the second physical location. That is, the remote computer can be onboarded once installed on customer premises.

After operation 608, process flow 600 moves to 610, where process flow 600 ends.

Figure 7:
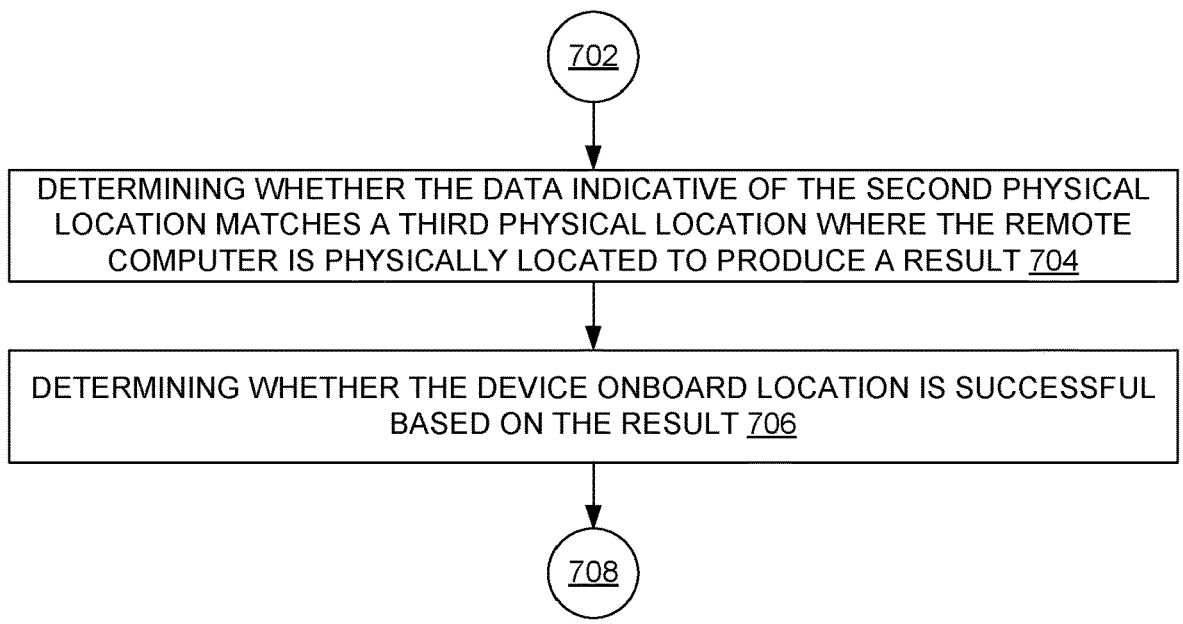
FIG. 7 illustrates an example process flow that can facilitate location aware trusted cloud resource provisioning, in accordance with an embodiment of this disclosure.

FIG. 7 illustrates an example process flow 700 for evaluating a computer with a part replacement and that can facilitate location aware trusted cloud resource provisioning, in accordance with an embodiment of this disclosure. In some examples, one or more embodiments of process flow 700 can be implemented by location aware trusted cloud resource provisioning component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, and/or process flow 900 of FIG. 9.

Process flow 700 begins with 702, and moves to operation 704.

Operation 704 depicts determining whether the data indicative of the second physical location matches a third physical location where the remote computer is physically located to produce a result. That is, a secure onboard service can use a location verification policy status to determine whether a device onboard location is successful or fails, to enforce a next set of security policies.

After operation 704, process flow 700 moves to operation 706.

Operation 706 depicts determining whether the device onboard location is successful based on the result. That is, onboarding can be allowed or denied based on a result of the location verification policy status.

After operation 706, process flow 700 moves to 708, where process flow 700 ends.

FIG. 8 illustrates an example process flow 800 for evaluating a computer with a part replacement and that can facilitate location aware trusted cloud resource provisioning, in accordance with an embodiment of this disclosure. In some examples, one or more embodiments of process flow 800 can be implemented by location aware trusted cloud resource provisioning component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, and/or process flow 900 of FIG. 9.

Process flow 800 begins with 802, and moves to operation 804.

Operation 804 depicts receiving an untrusted onboard announcement message from a remote access controller hardware. In some examples, operation 804 can be implemented in a similar manner as operation 704 of FIG. 7.

In some examples, the receiving the untrusted onboard announcement message from the remote computer occurs in response to the remote computer being powered on. That is, when a remote computer is powered on a client application can initiate an onboarding process by sending an untrusted onboard announce notification to a cloud console.

After operation 804, process flow 800 moves to operation 806.

Operation 806 depicts, based on the untrusted onboard announcement message, initiating an onboarding service policy to verify a device location claims policy associated with the remote computer. In some examples, operation 806 can be implemented in a similar manner as operation 706 of FIG. 7.

After operation 806, process flow 800 moves to operation 808.

Operation 808 depicts receiving, from the remote computer, an indication of whether a first physical location of the remote computer matches a second physical location of the remote computer that is stored in a certificate on the remote computer, according to a port-based network access control protocol. In some examples, operation 808 can be implemented in a similar manner as operation 708 of FIG. 7.

In some examples, the indication of whether the first physical location of the remote computer matches the second physical location of the remote computer that is stored in the certificate on the remote computer is received from a remote access controller hardware component of the remote computer. Using the example of FIG. 3, this indication can be originated from remote access controller hardware component 312.

In some examples, the indication indicates whether an 802.1x protocol certificate hostname that is associated with the remote computer matches an entity attestation token attribute extensible authentication protocol-transport layer platform certificate hostname that is stored in the certificate. That is, the indication can indicates verifying an EAS_T-SL_Cert.

In some examples, the untrusted onboard announcement message and the indication of whether the first physical location of the remote computer matches the second physical location of the remote computer that is stored in a certificate on the remote computer are received by the system according to a layer 2 communications network protocol. That is, these communications can occur on a data link layer of an Open Systems Interconnection model of computer networking.

After operation 808, process flow 800 moves to operation 810.

Operation 810 depicts determining whether device onboard location is successful based on a location verification policy status and the indication. In some examples, operation 810 can be implemented in a similar manner as operation 710 of FIG. 7.

In some examples, the location verification policy status corresponds to a data privacy standard that is associated with the first physical location of the remote computer. In some examples, the location verification policy status corresponds to a compliance standard that is associated with the first physical location of the remote computer. That is, a physical location of a remote computer can be verified so as to adhere to compliance rules and/or privacy laws.

After operation 810, process flow 800 moves to 812, where process flow 800 ends.

FIG. 9 illustrates an example process flow 900 for evaluating a computer with a part replacement and that can facilitate location aware trusted cloud resource provisioning, in accordance with an embodiment of this disclosure. In some examples, one or more embodiments of process flow 900 can be implemented by location aware trusted cloud resource provisioning component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, and/or process flow 800 of FIG. 8.

Process flow 900 begins with 902, and moves to operation 904.

Operation 904 depicts receiving an untrusted onboard announcement message from a remote computer. In some examples, operation 904 can be implemented in a similar manner as operation 704 of FIG. 7.

In some examples, operation 904 comprises signing a platform certificate with a certificate authority that is associated with the system to produce a signed platform certificate, and storing the signed platform certificate in a remote access controller hardware component of the remote computer. That is, an entity that manufactures the computer can sign a certificate with a root certificate authority before sending it to an on-premises location.

In some examples, storing the signed platform certificate in the remote access controller hardware component of the remote computer is performed while the remote computer is physically located at a third physical location that is associated with an entity that controls the system, and before the remote computer is transferred to a fourth physical location from which the untrusted onboard announcement message from the remote computer originated.

In some examples, the entity is a first entity, and operation 904 comprises receiving, via an account associated with a second entity that is associated with the fourth physical location, data indicative of the fourth physical location. That is, customer order data can indicate where the remote computer will eventually be installed.

In some examples, the signed platform certificate comprises a remote access controller hardware component entity attestation token attribute extensible authentication protocol-transport layer platform certificate hostname. This can be an EAP_TLS_Cert.

After operation 904, process flow 900 moves to operation 906.

Operation 906 depicts, based on the untrusted onboard announcement message, initiating an onboarding service policy to verify a device location claims policy associated with the remote computer. In some examples, operation 906 can be implemented in a similar manner as operation 706 of FIG. 7.

After operation 906, process flow 900 moves to operation 908.

Operation 908 depicts receiving, from the remote computer, an indication of whether a first physical location of the remote computer matches a second physical location of the remote computer that is stored in a certificate on the remote computer. In some examples, operation 908 can be implemented in a similar manner as operation 708 of FIG. 7.

After operation 908, process flow 900 moves to operation 910.

Operation 910 depicts determining whether device onboard location is successful based on a location verification policy status and the indication. In some examples, operation 910 can be implemented in a similar manner as operation 710 of FIG. 7.

In some examples, determining whether the device onboard location is successful comprises determining whether the data indicative of the fourth physical location matches the third physical location where the remote computer is physically located. That is, customer order data that indicate where the remote computer will eventually be installed can be compared with where the remote computer is actually physically installed at the time of an onboarding request.

After operation 910, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of hybrid cloud management system 102, and/or on-premises computers 106 of FIG. 1, and/or cloud console 302, secure onboard 304, digital platform 306, manufacturer 308, and/or remote computer 310 of FIG. 3.

In some examples, computing environment 1000 can implement one or more embodiments of the process flows of FIGS. 3-9 to facilitate location aware trusted cloud resource provisioning.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory coupled to the processor, comprising instructions that, in response to execution by the processor, cause the system to perform operations, comprising:
receiving an untrusted onboard announcement message from a remote computer;
based on the untrusted onboard announcement message, initiating an onboarding service policy to verify a device location claims policy associated with the remote computer;
receiving an indication of a remote access controller hardware component of the remote computer, wherein the indication is of verifying a network port authentication policy applicable to determine whether a port-based network access control protocol certificate hostname that is associated with the remote computer matches an entity attestation token attribute extensible authentication protocol-transport layer platform certificate hostname of the remote access controller hardware component to determine a network authentication status; and
determining whether device onboard location is successful based on a device location verification policy status and the indication.

2. The system of claim 1, wherein the operations further comprise:
signing a platform certificate with a certificate authority that is associated with the system to produce a signed platform certificate; and
storing the signed platform certificate in storage associated with the remote access controller hardware component of the remote computer.

3. The system of claim 2, wherein the storing of the signed platform certificate in the storage associated with the remote access controller hardware component of the remote computer is performed while the remote computer is physically located in a first physical location that is associated with an entity that controls the system, and before the remote computer is transferred to a second physical location from which the untrusted onboard announcement message from the remote computer originated.

4. The system of claim 3, wherein the entity is a first entity, and wherein the operations further comprise:
receiving data indicative of the second physical location, the data originating via an account associated with a second entity that is associated with the second physical location.

5. The system of claim 2, wherein the signed platform certificate comprises the entity attestation token attribute extensible authentication protocol-transport layer platform certificate hostname of the remote computer.

6. The system of claim 5, wherein using the location verification policy status to determine whether the device onboard location is successful comprises:
determining whether the data indicative of the second physical location matches a third physical location where the remote computer is physically located.

7. The system of claim 1, wherein the entity attestation token attribute extensible authentication protocol-transport layer platform certificate hostname of the remote computer comprises a fully qualified domain name.

8. A method, comprising:
receiving, by a system comprising a processor, an untrusted onboard announcement message from a remote access controller hardware;
based on the untrusted onboard announcement message, initiating, by the system, an onboarding service policy to verify a device location claims policy associated with the remote computer;
receiving, by the system and from the remote computer, an indication of whether a first physical location of the remote computer matches a second physical location of the remote computer that is stored in a certificate on the remote computer, according to a port-based network access control protocol; and
determining, by the system, whether device onboard location is successful based on a location verification policy status and the indication.

9. The method of claim 8, wherein the receiving the untrusted onboard announcement message from the remote computer occurs in response to the remote computer being powered on.

10. The method of claim 8, wherein the indication of whether the first physical location of the remote computer matches the second physical location of the remote computer that is stored in the certificate on the remote computer is received from a remote access controller hardware component of the remote computer.

11. The method of claim 8, wherein the indication indicates whether an 802.1x protocol certificate hostname that is associated with the remote computer matches an entity attestation token attribute extensible authentication protocol-transport layer platform certificate hostname that is stored in the certificate.

12. The method of claim 8, wherein the location verification policy status corresponds to a data privacy standard that is associated with the first physical location of the remote computer.

13. The method of claim 8, wherein the location verification policy status corresponds to a compliance standard that is associated with the first physical location of the remote computer.

14. The method of claim 8, wherein the untrusted onboard announcement message and the indication of whether the first physical location of the remote computer matches the second physical location of the remote computer that is stored in a certificate on the remote computer are received by the system according to a layer 2 communications network protocol.

15. A non-transitory computer-readable medium comprising instructions that, in response to execution, cause a system comprising a processor to perform operations, comprising:
receiving an untrusted onboard announcement message from a remote computer;
based on the untrusted onboard announcement message, initiating an onboarding service policy to verify a device location claims policy associated with the remote computer;
receiving, from the remote computer, an indication of whether a first physical location of the remote computer matches a second physical location of the remote computer that is stored in a certificate on the remote computer; and determining whether device onboard location is successful based on a location verification policy status and the indication.

16. The non-transitory computer-readable medium of claim 15, wherein the operations further comprise:
signing a platform certificate with a certificate authority that is associated with the system to produce a signed platform certificate; and
storing the signed platform certificate in a remote access controller hardware component of the remote computer.

17. The non-transitory computer-readable medium of claim 16, wherein the storing of the signed platform certificate in the remote access controller hardware component of the remote computer is performed while the remote computer is physically located at a third physical location that is associated with an entity that controls the system, and before the remote computer is transferred to a fourth physical location from which the untrusted onboard announcement message from the remote computer originated.

18. The non-transitory computer-readable medium of claim 17, wherein the entity is a first entity, and wherein the operations further comprise:
receiving, via an account associated with a second entity that is associated with the fourth physical location, data indicative of the fourth physical location.

19. The non-transitory computer-readable medium of claim 17, determining whether the device onboard location is successful comprises:
determining whether the data indicative of the fourth physical location matches the third physical location where the remote computer is physically located.

20. The non-transitory computer-readable medium of claim 16, wherein the signed platform certificate comprises a remote access controller hardware component entity attestation token attribute extensible authentication protocol-transport layer platform certificate hostname.

* * * * *